United States Patent
Niu et al.

(10) Patent No.: US 11,136,507 B2
(45) Date of Patent: Oct. 5, 2021

(54) CONTINUOUS FEEDING PROCESS AND DEVICE FOR WASTE FLEXIBLE POLYMER MATERIAL

(71) Applicant: NIUTECH ENVIRONMENT TECHNOLOGY CORPORATION, Shandong (CN)

(72) Inventors: Xiaolu Niu, Jinan (CN); Guoqian Han, Jinan (CN); Jie Niu, Jinan (CN); Lanying Tong, Jinan (CN); Haimin Zhang, Jinan (CN); Zongcai Li, Jinan (CN); Shengyu Shi, Jinan (CN); Bin Niu, Jinan (CN)

(73) Assignee: NIUTECH ENVIRONMENT TECHNOLOGY CORPORATION, Jinan (CN)

( * ) Notice: Subject to any disclaimer, the term of this patent is extended or adjusted under 35 U.S.C. 154(b) by 0 days.

(21) Appl. No.: 16/764,727

(22) PCT Filed: Dec. 3, 2018

(86) PCT No.: PCT/CN2018/118895
§ 371 (c)(1),
(2) Date: May 15, 2020

(87) PCT Pub. No.: WO2019/148958
PCT Pub. Date: Aug. 8, 2019

(65) Prior Publication Data
US 2021/0171834 A1   Jun. 10, 2021

(30) Foreign Application Priority Data

Jan. 30, 2018   (CN) .......................... 201810088677.3

(51) Int. Cl.
*C10B 31/06* (2006.01)
*B01J 4/00* (2006.01)
(Continued)

(52) U.S. Cl.
CPC ............... *C10B 31/06* (2013.01); *B01J 4/007* (2013.01); *B01J 6/008* (2013.01); *C10B 53/07* (2013.01);
(Continued)

(58) Field of Classification Search
CPC . C10B 31/06; C10G 53/07; C10G 1/10; B01J 4/007; B01J 6/008
See application file for complete search history.

(56) References Cited

U.S. PATENT DOCUMENTS

| | | | | |
|---|---|---|---|---|
| 4,123,332 A | * | 10/1978 | Rotter | C10B 47/44 201/15 |
| 4,983,278 A | * | 1/1991 | Cha | C10B 47/44 208/407 |
| 5,389,691 A | * | 2/1995 | Cha | C10G 1/02 521/41 |
| 5,756,871 A | * | 5/1998 | Wang | C10G 1/02 585/241 |

(Continued)

FOREIGN PATENT DOCUMENTS

| | | |
|---|---|---|
| CN | 102002383 A | 4/2011 |
| CN | 102260515 A | 11/2011 |

(Continued)

OTHER PUBLICATIONS

Mar. 13, 2019 Search Report issued in International Patent Application No. PCT/CN2018/118895.

*Primary Examiner* — Jonathan Miller
(74) *Attorney, Agent, or Firm* — Oliff PLC

(57) ABSTRACT

A continuous feeding process and device for waste flexible polymer material; wherein the process continuously feeds waste flexible polymer material into a subsequent pyrolysis apparatus following compression, cutting and dispersion; the waste flexible polymer material is pre-treated during compression, cutting and dispersion to achieve continuous sealing feeding, while pyrolysis oil gas preheats and self-lubricates the device; the device used includes a feeding apparatus, a material dispersion apparatus and a screw feeder; the material is compressed, cut and dispersed in the (Continued)

feeding apparatus and the material dispersion apparatus, and then falls into the screw feeder, being preheated and thermally sealed by the pyrolysis oil-gas in the screw feeder; by using such a process, waste flexible polymer material from various sources may be continuously fed for pyrolysis, fully using the temperature of an oil-gas generated in a pyrolysis machine for preheating and device lubrication.

3 Claims, 3 Drawing Sheets

(51) Int. Cl.
 *B01J 6/00* (2006.01)
 *C10B 53/07* (2006.01)
 *C10G 1/10* (2006.01)
(52) U.S. Cl.
 CPC ....... *C10G 1/10* (2013.01); *C10G 2300/1003* (2013.01)

(56) References Cited

U.S. PATENT DOCUMENTS

| | | | |
|---|---|---|---|
| 6,276,286 B1* | 8/2001 | Williams | F23G 5/033 |
| | | | 110/101 C |
| 7,947,155 B1* | 5/2011 | Green | C10B 53/02 |
| | | | 201/2 |
| 8,795,476 B2* | 8/2014 | Flottvik | C10B 47/44 |
| | | | 202/118 |
| 10,364,394 B2* | 7/2019 | Strezov | B65G 33/34 |
| 10,377,951 B2* | 8/2019 | Vanttinen | C10B 35/00 |
| 10,646,879 B2* | 5/2020 | Gabay | B02C 18/0092 |
| 10,731,082 B2* | 8/2020 | Tenore | C10B 31/08 |
| 10,961,062 B2* | 3/2021 | Tenore | B30B 15/165 |
| 2018/0010049 A1* | 1/2018 | Tenore | B01J 4/007 |
| 2019/0054475 A1* | 2/2019 | Gabay | B02C 18/0092 |

FOREIGN PATENT DOCUMENTS

| | | |
|---|---|---|
| CN | 203403064 U | 1/2014 |
| CN | 108085044 A | 5/2018 |
| CN | 208136160 U | 11/2018 |
| JP | 2014-066426 A | 4/2014 |

\* cited by examiner

CONTINUOUS FEEDING PROCESS AND DEVICE FOR WASTE FLEXIBLE POLYMER MATERIAL

TECHNICAL FIELD

The present invention relates to the technical field of waste pyrolysis, and specifically relates to a continuous feeding process and device for waste flexible polymer material.

BACKGROUND TECHNOLOGY

At present, both waste rubber and waste plastic belong to waste flexible polymer material which are difficult to treat. They are polymerized from polymers. The molecular weight of the material is larger, and it is difficult to effectively treat them by conventional processing means. Generally they are treated by adopting incineration in combination with deep burialism, however, this treatment mode will have a more serious impact on the environment. Therefore, how to deal with this part of the material is a problem needing prompt solutions. In the prior art, it is a very good choice to treat the material by high temperature pyrolyzing. However, the material can be fed for the subsequent treatment only after dispersion. This part of the material is flexible material. Once being compressed, they become denser. It is more difficult to disperse and feed. Generally, the existing method is that they are directly crushed by mechanical force at the initial stage and then they are dispersed by a distributor. This not only increases the energy consumption, but also makes the feed end to be difficult to seal, which cannot meet the requirements of pyrolysis in the later stage. At the same time, a separate preheating unit is required to preheat the material, it is high in energy consumption and serious in device loss, which seriously restricts promotion and application of waste rubber and waste plastic pyrolysis technology, therefore, how to balance the above-mentioned problems has become one of the problems to be solved in the prior art.

CONTENT OF INVENTION

Aiming at the above problems, the present invention provides a continuous feeding process and device for waste flexible polymer material. In this process, the waste flexible polymer material is continuously fed into a subsequent pyrolysis apparatus following compression, cutting and dispersion. The waste flexible polymer material is pre-treated during compression, cutting and dispersion to achieve continuous sealing feeding, while a pyrolysis oil gas is used for preheating and self-lubricating the device; and the device used comprises a feeding apparatus, a material dispersion apparatus and a screw feeder. The material is compressed, cut and dispersed in the feeding apparatus and the material dispersion apparatus, and then fall into the screw feeder to be preheated and thermally sealed by means of the pyrolysis oil-gas in the screw feeder. By using such a process, waste flexible polymer material from various sources may be continuously fed for pyrolysis, fully using the temperature of an oil-gas generated in a pyrolysis machine for preheating and device lubrication, thereby improving the efficiency of pyrolysis and reducing the loss and energy consumption of the device.

The present invention adopts the following technical solution:

A continuous feeding process for waste flexible polymer material. This process comprises that, the waste flexible polymer material is continuously fed into a subsequent pyrolysis apparatus following compression, cutting and dispersion. The waste flexible polymer material is pre-treated during compression, cutting and dispersion to achieve continuous sealing feeding while a pyrolysis oil-gas is used for preheating and self-lubricating the device, and the specific steps are:

Continuously compress the waste flexible polymer material, and cut and disperse it after compression. During the dispersing process, the material is pre-heated by the oil-gas generated during pyrolysis, meanwhile the oil-gas is condensed, and the condensed oil fluid is utilized to carry out self-lubrication for the subsequent feeding device;

The said compression is divided into two compressions, the said cutting and dispersion is completed by a spiral cutting device or other cutting devices, and the subsequent feeding device is a screw feeder;

The said two compressions are preferably a combination of oblique compression and horizontal compression;

Further, the said waste flexible polymer material is selected from waste plastics or waste tires, preferably waste plastics;

After adopting this process, the waste flexible polymer material is compressed into a regular and dense entirety after two compressions. The material can be continuously cut and dispersed. During the cutting and dispersion process, the high-temperature oil-gas of the pyrolysis machine passes through the subsequent feeding device to enter into the cutting and dispersing section with counter-current. The material is preheated in this section. Under the action of preheating, dense material become softer, which facilitates the operations of cutting and dispersion. Meanwhile, as heat of the oil-gas is released in this section, part of the oil-gas condenses into oil fluid and returns to the subsequent feeding device, which achieves self-lubrication of the device. At the same time, the oil fluid can be used for wrapping the surface of the cut material to further preheat the material and reduce temperature difference between the material and the pyrolysis chamber, so that the pyrolysis efficiency is increased. At the same time, the uncondensed oil-gas can be discharged from the device to be recovered in the conventional condensation process. This maximizes the utilization of heat carried by the oil-gas, it realizes the conversion of heat energy between the feeding apparatus and the pyrolysis apparatus, avoids the occurrence of extreme temperature differences in the device, and realizes heat sealing of the pyrolysis process; the continuous feeding of waste flexible polymer material through this process makes the material become dispersed flakes, after preheating, the temperature difference between the material and pyrolysis temperature is reduced, the probability of excessive pyrolysis and coking is reduced, and it has an excellent effect for improving the subsequent pyrolysis efficiency; and moisture in the waste flexible polymer material can be removed after two compressions, and the moisture can be discharged before entering the pyrolysis machine.

In addition, the invention also provides a continuous feeding device for waste flexible polymer material. The device includes a feeding apparatus, a material dispersion apparatus and a screw feeder. The specific structure is:

The feeding apparatus is composed of a feeding silo, an inclined silo and a cavity. The inclined silo and the cavity are both provided with feeding pistons. The discharge end of the cavity is connected with the material dispersion apparatus. The material dispersion apparatus includes a housing and a dispersion apparatus arranged in the housing, and the said dispersion apparatus is a spiral cutting device; the bottom of the said dispersion apparatus is connected with the screw feeder, and the discharge end of the said screw feeder is connected to the pyrolysis machine;

The said feeding apparatus is composed of the feeding silo, the inclined silo and the cavity, wherein the feeding silo is arranged on the inclined silo, the said cavity is arranged at the bottom of the inclined silo, the top of the inclined silo is provided with an inclined feeding piston, a horizontal feeding piston is arranged on the side of the cavity away from the discharge end, the section of the said cavity is circular, and the bottom of the inclined feeding piston is an arc-shaped depression matching with the section of the cavity;

The discharge end of the said cavity is connected with the material dispersion apparatus. The material dispersion apparatus comprises a housing, a side of the said housing is provided with a feed inlet matching with the discharge end of the cavity, and the top of the housing is provided with a sealing plate, an electric motor is arranged on the upper part of the sealing plate, a screw rod penetrating the sealing plate is arranged on the lower part of the electric motor, a spiral is arranged on the screw rod, the top of the spiral is edged, the screw rod and the spiral form a spiral cutting device, and the spiral cutting device corresponds to the position of the feed inlet, and an oil-gas outlet is also arranged on the housing;

The feed inlet end of the said screw feeder is connected to the lower part of the housing of the dispersion apparatus, and the discharge end is connected to the pyrolysis machine. The screw feeder is provided with continuous feeding spirals, and a drive motor is arranged outside the screw feeder;

After adopting the above structure, the compressed waste flexible polymer material shall be filled in the discharge end of the cavity before starting up, so that the discharge end can be sealed, and meanwhile it is convenient for subsequent waste flexible polymer material added to be compressed; if it is shut down after continuous operation, the compressed material may not be replenished any more, and the sealing is realized by accumulation of the compressed material at the discharge end of the cavity; after the above operation is completed, the waste flexible polymer material is input through the feeding silo to enter the inclined silo, under the action of the inclined feeding piston, the above-mentioned material is sent into the cavity to be compressed by the inclined feeding piston into a shape matching with the cavity. After the material enters the cavity, under the action of the horizontal feeding piston, the material is compressed horizontally to the discharge end of the cavity, as the discharge end of the cavity is filled with the compressed waste flexible polymer material, the newly incoming material is further compressed, and at the same time, a part of the compressed flexible waste polymer material at the previous end can be squeezed from the discharge end to enter the subsequent material dispersion device for rear operation; by adopting the above structure, the material is compressed twice under the action of the inclined piston and the horizontal piston, they can smoothly enter the cavity and be compressed into dense material, which realizes sealing of the cavity, meanwhile moisture in the material can also be squeezed and removed, this part of substances such as moisture, etc. can be discharged through the drain hole arranged on the side away from the discharge end of the cavity, and the horizontal piston also plays a role of feeding, which is suitable for continuous operation;

After the above compressed waste flexible polymer material is fed into the housing through the feed inlet, the motor drives the screw rod to rotate, and the edged spiral on the screw rod also rotates, thereby forming a spiral cutter. When the compressed flexible material is exposed a certain length from the feed inlet, it is contacted with the spiral cutter. Under the action of the cutter, the compressed flexible material is cut into flakes to fall with the spiral. Due to rotation of the spiral, the material is dispersed, and the material that become flakes is heated faster during the subsequent pyrolysis, which improves the pyrolysis efficiency. According to the subsequent needs, the said spiral can be a discontinuous spiral, so that discontinuous flakes can be obtained, and the dispersion effect is improved;

At this moment, since the screw feeder connected with the lower part of the housing is directly connected to the pyrolysis machine, the high-temperature oil-gas generated in the pyrolysis machine will automatically enter the screw feeder and enter the housing of the dispersion apparatus. As material in the dispersion apparatus is at normal temperature, heat can be absorbed from the oil-gas to achieve pre-heating of the material. At the same time, the spiral cutting device will also be heated. This can achieve the effect of cutting butter with a hot knife, reducing the resistance to cutting, and meanwhile, the oil-gas releasing heat can be condensed to form oil fluid, the oil fluid will return to the screw feeder and gather at the bottom of the screw feeder, so that oil film is formed between the spiral and the feeder housing, which realizes self-lubrication of the screw feeder; as the cut materials are flakes, the oil fluid can wrap on the surface of the cut materials after falling into the screw feeder, and the material is further preheated, reducing the temperature difference between the material and the pyrolysis chamber. While improving the pyrolysis efficiency, it also facilitates conveying of the spiral, and the uncondensed oil-gas in the housing of the dispersion apparatus can be discharged from the oil-gas outlet on the housing to enter the conventional condensation process for recovery. At the same time, as the pre-heating temperature of the oil-gas does not reach the pyrolysis temperature of the material, the material can be prevented from pyrolyzing in the feeding device, which improves the yield of the subsequent pyrolysis, meanwhile the preheating of material enables the compressed material which are not cut yet to be more flexible, so that the sealing for the discharge end of the cavity is further improved, and the sealing performance of the entire device is greatly improved;

By using this device, it can be well matched with the process of the present invention, which maximizes the utilization of heat carried by the oil-gas, it achieves the conversion of heat energy between the feeding device and the pyrolysis apparatus, and it has an excellent effect of improving the subsequent pyrolysis efficiency.

To sum up, by using such a process and a device, waste flexible polymer material from various sources can be continuously fed for pyrolysis, fully using the temperature of an oil-gas generated in a pyrolysis machine for preheating and device lubrication, thereby improving the efficiency of pyrolysis and reducing the loss and energy consumption of the device.

Figure 1:
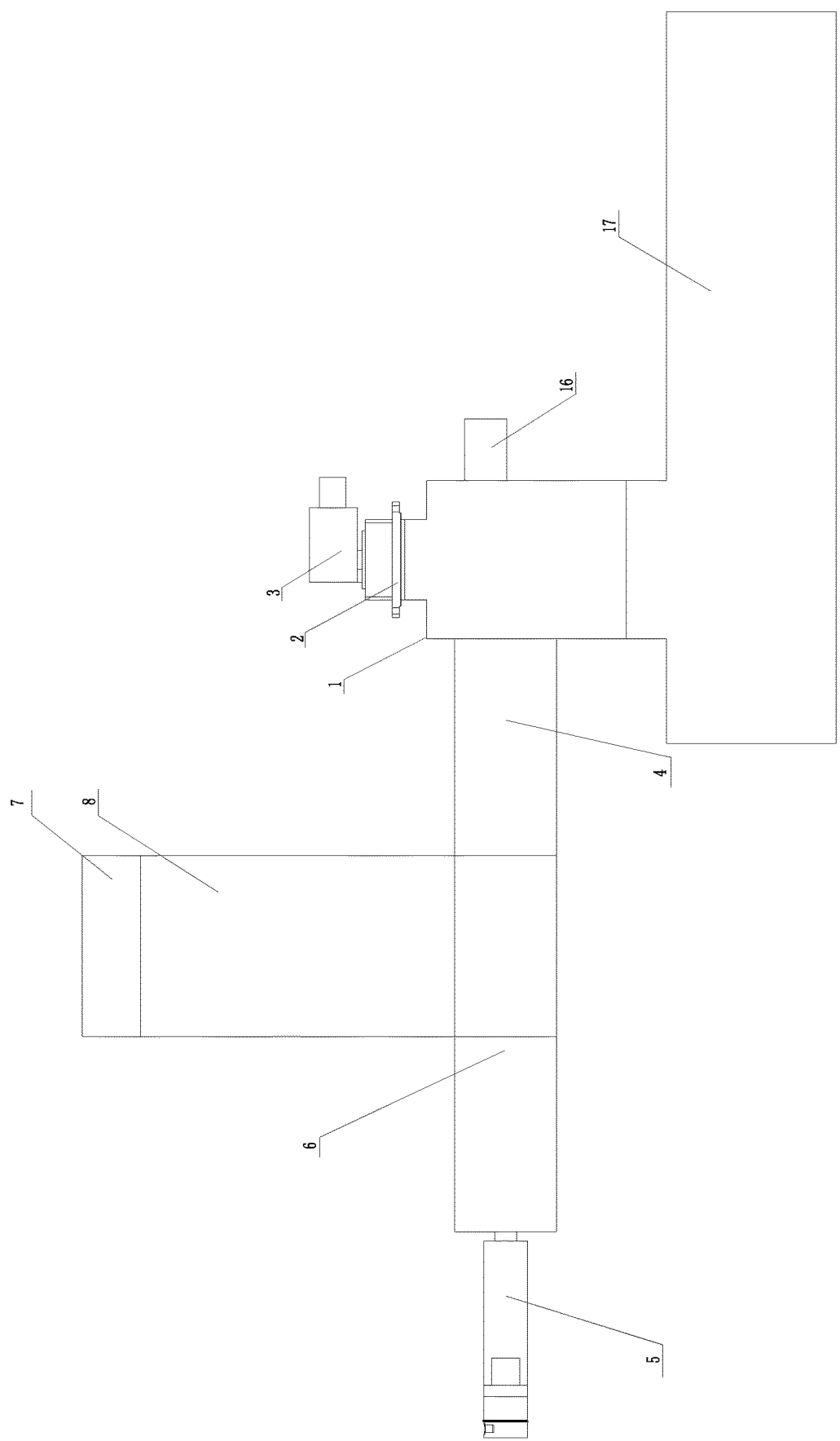
FIG. 1 is the outline diagram of the continuous feeding device for waste flexible polymer material of this invention.
Figure 2:
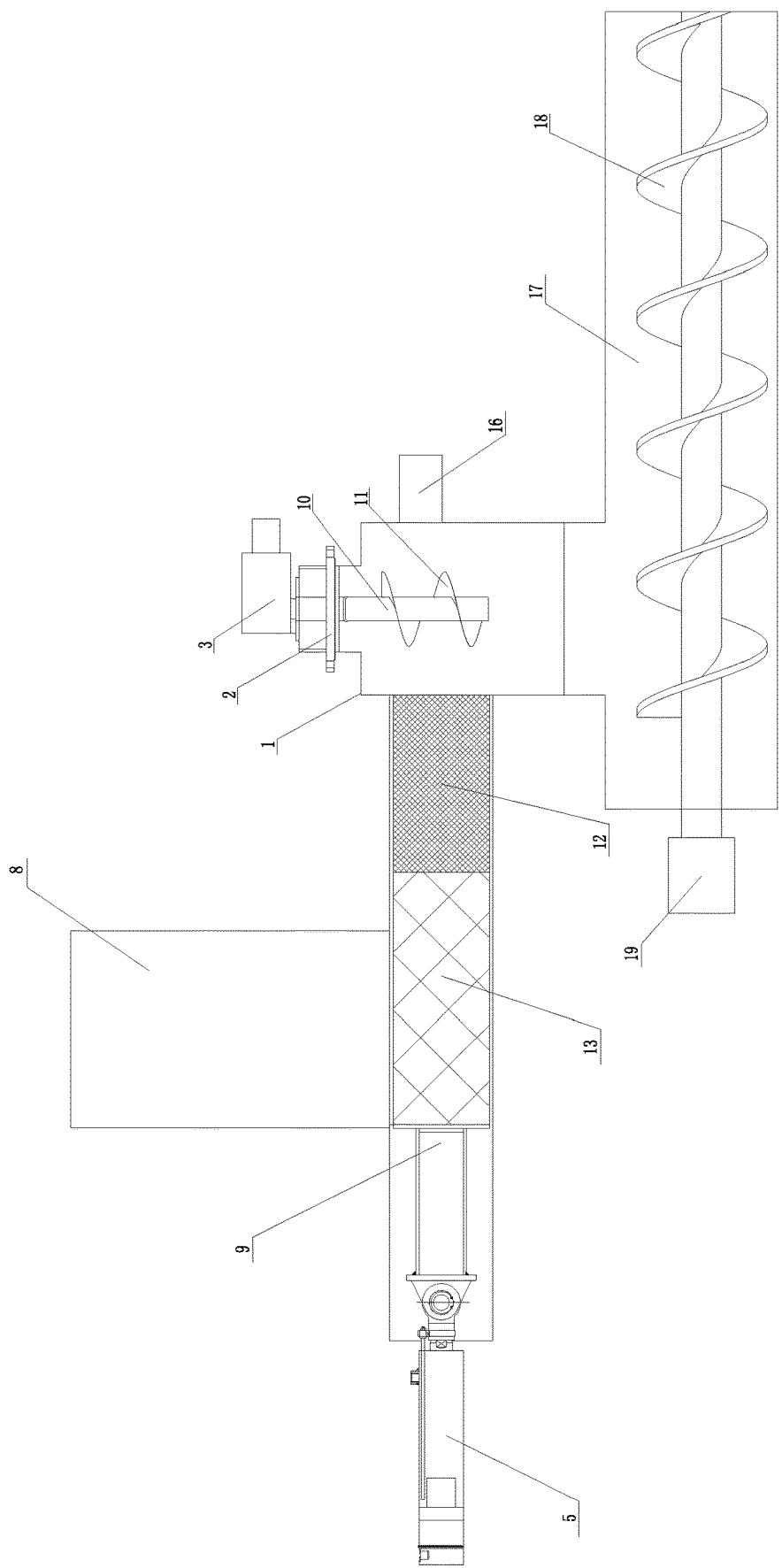
FIG. 2 is the internal structure diagram of the continuous feeding device for waste flexible polymer material with the inclined silo removed of this invention.
Figure 3:
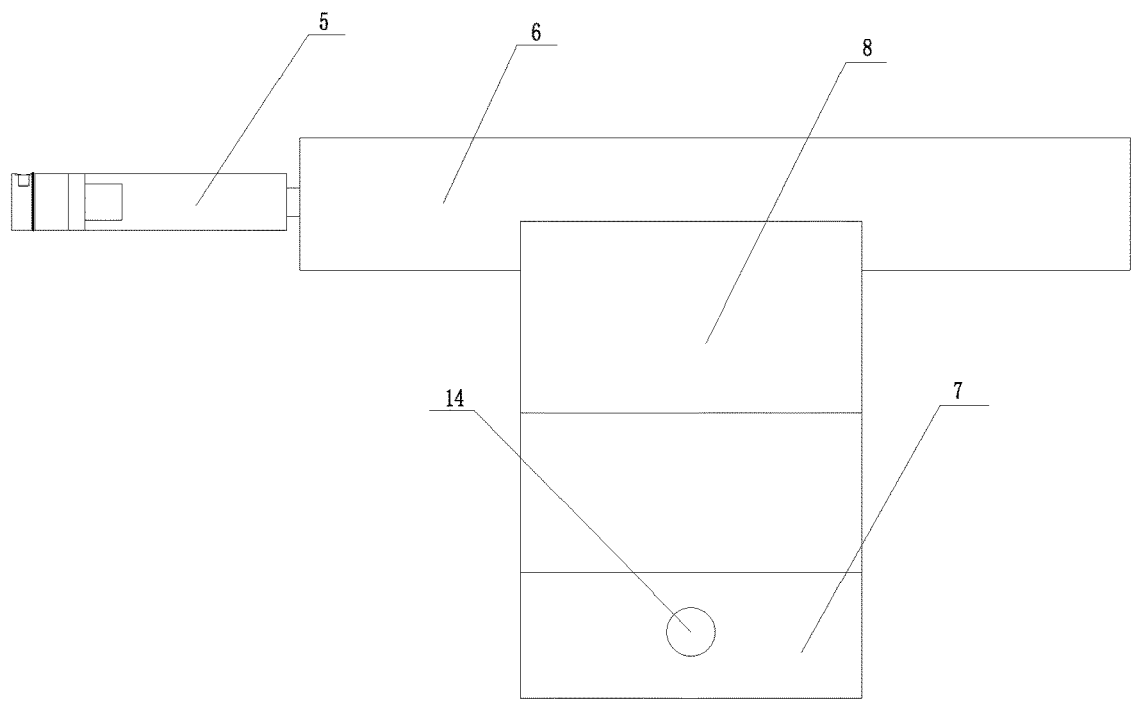
FIG. 3 is the vertical view of the feeding device of this invention.
Figure 4:
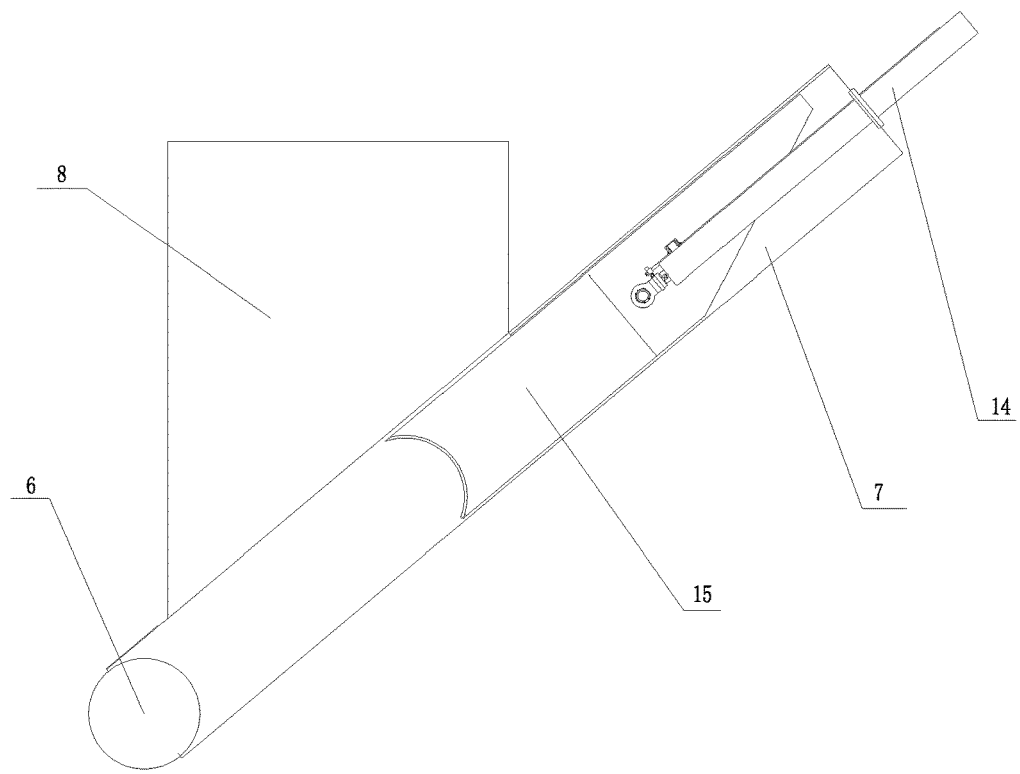
FIG. 4 is the side view of the feeding device of this invention.

Wherein, 1. the housing, 2. the sealing plate, 3. the electric motor, 4. the discharge end of the cavity, 5. the horizontal feeding piston, 6. the cavity, 7. the inclined silo, 8. the feeding silo, 9. horizontal feeding piston rod, 10. the screw rod, 11. the spiral, 12. the compressed flexible polymer material, 13. the waste flexible polymer material, 14. the inclined feeding piston rod, 15. the inclined feeding piston, 16. the oil-gas outlet, 17. the screw feeder, 18. the feeding spirals, and 19. the drive motor.

SPECIFIC EMBODIMENTS

Process Embodiment 1

A continuous feeding process for waste flexible polymer material. This process comprises that, the waste flexible polymer material is continuously fed into a subsequent pyrolysis apparatus following compression, cutting and dispersion. The waste flexible polymer material is pre-treated during compression, cutting and dispersion to achieve continuous sealing feeding while a pyrolysis oil-gas is used for preheating and self-lubricating the device, and the specific steps are:

Continuously compress the waste flexible polymer material, and cut and disperse it after compression. During the dispersing process, the material is preheated by the oil-gas generated during pyrolysis, meanwhile the oil-gas is condensed, and the condensed oil fluid is utilized to carry out self-lubrication for the subsequent feeding device;

The said compression is divided into two compressions, the said cutting and dispersion is completed by a spiral cutting device, and the subsequent feeding device is a screw feeder;

The said waste flexible polymer material is selected from waste plastics;

Process Embodiment 2

A continuous feeding process for waste flexible polymer material. This process comprises that, the waste flexible polymer material is continuously fed into a subsequent pyrolysis apparatus following compression, cutting and dispersion. The waste flexible polymer material is pre-treated during compression, cutting and dispersion to achieve continuous sealing feeding while a pyrolysis oil-gas is used for preheating and self-lubricating the device, and the specific steps are:

Continuously compress the waste flexible polymer material, and cut and disperse it after compression. During the dispersing process, the material is preheated by the oil-gas generated during pyrolysis, meanwhile the oil-gas is condensed, and the condensed oil fluid is utilized to carry out self-lubrication for the subsequent feeding device;

The said compression is divided into two compressions, the said cutting and dispersion is completed by a spiral cutting device or rotatable tool rest, and the subsequent feeding device is a screw feeder;

The said waste flexible polymer material is selected from waste tires;

Device Embodiment

A continuous feeding device for waste flexible polymer material. The device includes a feeding apparatus, a material dispersion apparatus and a screw feeder. The feeding apparatus is composed of a feeding silo 8, an inclined silo 7 and a cavity 6. The inclined silo 7 and the cavity 6 are both provided with feeding pistons. The discharge end 4 of the cavity 6 is connected with the material dispersion apparatus. The material dispersion apparatus includes a housing and a dispersion apparatus arranged in the housing, and the said dispersion apparatus is a spiral cutting device; The bottom of the said dispersion apparatus is connected with the screw feeder 17, and the discharge end of the said screw feeder 17 is connected to the pyrolysis machine;

The said feeding apparatus is composed of a feeding silo 8, an inclined silo 7 and a cavity 6, wherein the feeding silo 8 is arranged on the inclined silo 7, the said cavity 6 is arranged at the bottom of the inclined silo 7, the top of the inclined silo 7 is provided with an inclined feeding piston 15, a horizontal feeding piston 5 is arranged on the side of the cavity 6 away from the discharge end, the section of the said cavity 6 is circular, and the bottom of the inclined feeding piston 15 is an arc-shaped depression matching with the section of the cavity;

The discharge end 4 of the said cavity is connected with the material dispersion apparatus. The material dispersion apparatus comprises a housing 1, the side of the said housing 1 is provided with a feed inlet matching with the discharge end 4 of the cavity, and the top of the housing 1 is provided with a sealing plate 2, an electric motor 3 is arranged on the upper part of the sealing plate 2, a screw rod 10 penetrating the sealing plate 2 is arranged on the lower part of the electric motor 3, a spiral 11 is arranged on the screw rod 10, the top of the spiral 11 is edged, the screw rod 10 and the spiral 11 form a spiral cutting device, and the spiral cutting device corresponds to the position of the feed inlet, and an oil-gas outlet 16 is also arranged on the housing 1;

The feed inlet end of the said screw feeder 17 is connected to the lower part of the housing 1 of the dispersion apparatus, and the discharge end is connected to the pyrolysis machine. The screw feeder 17 is provided with continuous feeding spirals 18, and a drive motor 19 is arranged outside the screw feeder 17;

When it is used, the compressed waste flexible polymer material 12 shall be filled in the discharge end 4 of the cavity before starting up, so that the discharge end can be sealed, and meanwhile it is convenient for subsequent waste flexible polymer material 13 added to be compressed; if it is shut down after continuous operation, the compressed material may not be replenished any more, and the sealing is realized by accumulation of the compressed material at the discharge end of the cavity.

The invention claimed is:

1. A continuous feeding device for waste flexible polymer material, comprising
a feeding apparatus and a material dispersion apparatus, the feeding apparatus is composed of a feeding silo, an inclined silo and a cavity, the inclined silo and the cavity are both provided with feeding pistons, a discharge end of the cavity is connected with the material dispersion apparatus,
the material dispersion apparatus includes a housing and a spiral cutting device including a spiral cutter arranged in the housing a bottom of the material dispersion apparatus is connected with a screw feeder, and a discharge end of the screw feeder is connected to a pyrolysis machine;

wherein:
the feeding silo is arranged on the inclined silo,
the cavity is arranged at a bottom of the inclined silo,
a top of the inclined silo is provided with an inclined feeding piston,
a horizontal feeding piston is arranged on a side of the cavity away from the discharge end,
a cross-section of the cavity is circular,
a bottom of the inclined feeding piston is an arc-shaped depression matching with the cross-section of the cavity, and
the waste flexible polymer material is selected from waste plastics or waste tires.

2. The continuous feeding device according to claim 1, wherein:
a side of the housing is provided with a feed inlet matching with the discharge end of the cavity, and a top of the housing is provided with a sealing plate,
an electric motor is arranged on an upper part of the sealing plate,
a screw rod penetrating the sealing plate is arranged on a lower part of the electric motor,
a spiral is arranged on the screw rod,
a top of the spiral is sharpened,
the screw rod and the spiral form the spiral cutter of the spiral cutting device, and
the spiral cutting device is arranged at a side of the feed inlet.

3. The continuous feeding device according to claim 1, wherein:
a feed inlet end of the screw feeder is connected to a lower part of the housing of the material dispersion apparatus, and the discharge end is connected to the pyrolysis machine,
the screw feeder is provided with continuous feeding spirals, and
a drive motor is arranged outside the screw feeder.

* * * * *